F. TULLY.

Improvement in Lathe-Chucks.

No. 133,272. Patented Nov. 19, 1872.

WITNESSES.
Harry Smith
Thomas McSloan

Frank Tully
By his Attys.
Howson and Son

UNITED STATES PATENT OFFICE.

FRANK TULLY, OF PHILADELPHIA, PENNSYLVANIA, ASSIGNOR TO HIMSELF AND CHARLES H. BANES, OF SAME PLACE.

IMPROVEMENT IN LATHE-CHUCKS.

Specification forming part of Letters Patent No. 133,272, dated November 19, 1872.

*To all whom it may concern:*

Figure 3:
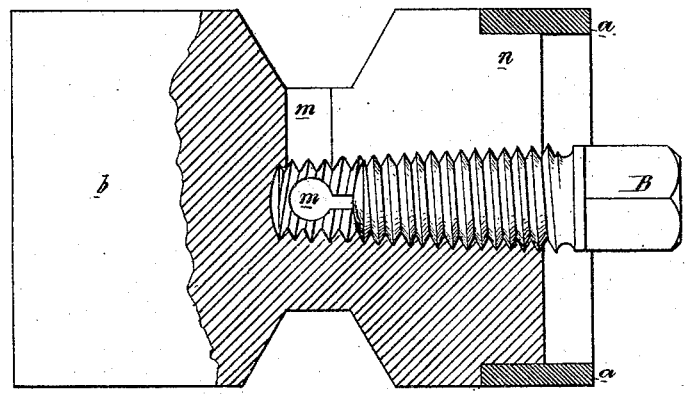

Be it known that I, FRANK TULLY, of Philadelphia, Pennsylvania, have invented an Improved Chuck, of which the following is a specification:

The object of my invention is the ready and true chucking in a lathe of such rings as have to be turned externally, internally, or both. I attain this object by a chuck, A, which is slotted at three or more points, $x$, as shown in the side view, Figure 1, and the end view, Fig. 2, so that it can be expanded by a central tapering screw, B, shown in the sectional view, Fig. 3, and thus caused to bear so tightly against the inside of the ring $a$ that the latter becomes, as it were, a part of the chuck.

The rear end $b$ of the chuck may be adapted to the threaded end of a lathe-spindle; or may be arranged for attachment to the face-plate of a lathe, as circumstances may suggest.

Figure 1:
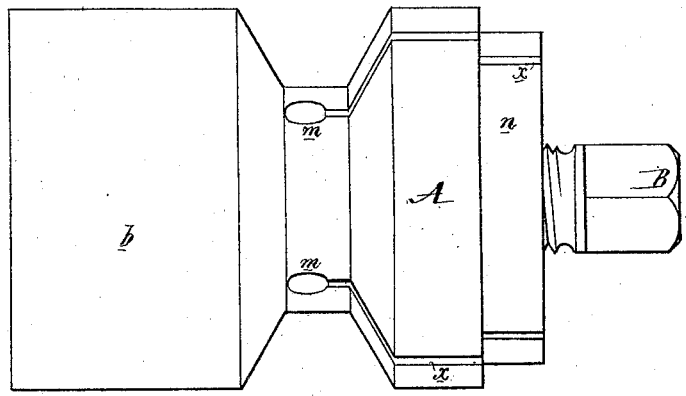
Figure 2:
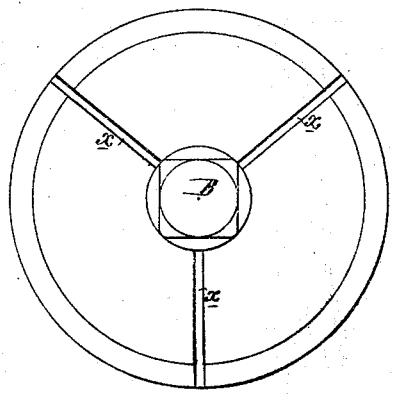

I prefer to make the chuck of wrought-iron or steel, and to make three slots in it, as shown in Fig. 2, each slot extending from the end of the chuck to the transverse holes $m$, as shown in the side view, Fig. 1. In the present instance the front end of the chuck is reduced in diameter for the reception of the ring $a$ to be turned, the rear edge of the ring bearing against a shoulder on the chuck.

After the ring has been adjusted to its place the tapering screw is so turned as to expand the slotted end of the chuck, the three portions into which this end is separated by the slots $x\,x\,x$ expanding simultaneously and equally, so that when the ring is secured by the expanded end of the chuck its concentricity with the latter is insured. When the ring has to be released all that is necessary is to partially withdraw the screw B, when the slotted end of the chuck will, owing to its inherent elasticity, resume its former contracted condition, and the ring will be at liberty. One-half, or thereabout, of the ring may overhang the end of the chuck, thereby permitting the turning of a portion of the interior of the ring, after which the latter may be removed, and readjusted to the chuck in a reversed position, and the remaining portion of its interior turned.

My improved chuck may be used with advantage in turning the rings employed for ring-and-traveler spinning; and will be a useful adjunct to lathes by which ferrules and other annular objects are turned.

I claim as my invention—

The combination of the slotted end of a chuck, A, with a central tapering screw, B.

In testimony whereof I have signed my names to this specification in the presence of two subscribing witnesses.

FRANK TULLY.

Witnesses:
WM. A. STEEL,
JOHN K. RUPERTUS.